(12) United States Patent
Schroeder

(10) Patent No.: US 7,752,978 B2
(45) Date of Patent: Jul. 13, 2010

(54) MULTIFACETED GUIDE RAIL, GUIDE ASSEMBLY AND METHOD OF FORMING GUIDE ASSEMBLIES

(75) Inventor: Jonathan R. Schroeder, Roscoe, IL (US)

(73) Assignee: Pacifiic Bearing Company, Rockford, IL (US)

( * ) Notice: Subject to any disclaimer, the term of this patent is extended or adjusted under 35 U.S.C. 154(b) by 238 days.

(21) Appl. No.: 11/943,958

(22) Filed: Nov. 21, 2007

(65) Prior Publication Data

US 2009/0127348 A1 May 21, 2009

(51) Int. Cl.
*B61B 5/02* (2006.01)

(52) U.S. Cl. .................. 104/245; 104/89; 104/242; 104/106; 104/107; 105/155

(58) Field of Classification Search .............. 104/106, 104/107, 118, 242, 245, 246, 247; 105/144, 105/154, 155
See application file for complete search history.

(56) References Cited

U.S. PATENT DOCUMENTS 2,229,015 A * 1/1941 King ..................... 105/30
3,998,497 A 12/1976 Koizumi
4,023,503 A * 5/1977 Grop ..................... 105/30
4,375,195 A * 3/1983 Tsuboi .................. 104/246
2007/0251408 A1* 11/2007 Fletcher et al. .......... 104/247

FOREIGN PATENT DOCUMENTS

| DE | 102 49 978 A1 | 5/2004 |
| WO | WO 03/000444 A1 | 1/2003 |
| WO | WO 2006/094734 | 9/2006 |

* cited by examiner

*Primary Examiner*—S. Joseph Morano
*Assistant Examiner*—Zachary Kuhfuss
(74) *Attorney, Agent, or Firm*—Reinhart Boerner Van Deuren P.C.

(57) ABSTRACT

A guide assembly, a guide rail for a guide assembly, and a method for forming guide assemblies are provided. The guide rail includes a plurality of facets angularly spaced from one another such that guide wheels for use with a guide carriage can ride on the guide rails in varying angular orientations. The guide rail preferably includes a pair of running rails that include at least four facets that extend the longitudinal length of the guide rail. The method includes providing a plurality of identical guide rails and a plurality of different carriages that have different characteristics, such as the orientation at which the guide wheels of the carriages engage the guide rails.

18 Claims, 6 Drawing Sheets

MULTIFACETED GUIDE RAIL, GUIDE ASSEMBLY AND METHOD OF FORMING GUIDE ASSEMBLIES

FIELD OF THE INVENTION

This invention generally relates to guide assemblies and more particularly to guide rails for guide assemblies, guide assemblies having carriages including guide wheels, and methods of forming guide assemblies.

BACKGROUND OF THE INVENTION

Guide assemblies are used to guide motion of devices operably connected to the guide assemblies such as drawers or working tools. A guide assembly typically includes a carriage that is supported and guided by a guide rail. The carriage typically includes guide wheels that ride on the guide rails. The guide rail defines the path along which the device can move. One such representative guide assembly is illustrated in International Patent Application assigned to T Race S.P.A. having International Application Number PCT/EP2006/002013 and having International Publication Number WO 2006/094734, which designates the United States, the teachings and disclosures of which are incorporated herein in there entireties by reference thereto. WO 2006/09734 teaches a guide assembly that includes a carriage having two different guide wheels to provide an auto-aligning effect. Each guide wheel includes a pair of converging sides that are separated by a flat surface. The flat surface of one guide wheel is wider than the flat surface of the other guide wheel. By having different flat surface widths, one guide wheel has the two converging sides ride on the guide rail while the other guide wheel rides primarily on the flat surface of the guide wheel independent of the two converging surfaces. The guide rails disclosed in WO 2006/09734 provide for only one orientation of the guide wheels relative to the guide rails.

The present invention relates to improvements of such guide assemblies and guide rails as well as methods of forming guide assemblies.

BRIEF SUMMARY OF THE INVENTION

The present invention has several aspects that may be claimed and stand as patentable individually or in combination including but not limited to the following.

In one aspect, the invention provides a guide rail for a guide assembly that a base portion and a first running rail portion that provides for supporting a guide wheel in multiple orientations. The first running rail portion is joined to the base portion and defines a longitudinal running axis of the guide rail. The first running rail includes a plurality of bearing facets forming a generally convex outer periphery of the running rail about a first central axis of the first running rail portion. The central axis is parallel to the running axis. The plurality of bearing facets includes at least four bearing facets extending parallel to the first central axis. Each of the bearing facets have a width that extends perpendicularly to the first central axis.

According to a preferred arrangement of embodiments of this first aspect, the widths of all of the facets are equal. In a further preferred arrangement, the guide rail includes a second running rail portion, with the first and second running rail portions being substantially identical to one another. In yet a further preferred arrangement, the two running rails include at least nine facets with adjacent pairs of the facets extending relative to one another at an angle of approximately 150 degrees. In yet another preferred arrangement, the facets of the running rails extend about the central axes of the running rails by at least 180 degrees and even more preferably by at least 250 degrees.

In another aspect, the invention provides a linear guide rail for supporting at least one concave profile guide wheel having first and second guide surfaces converging toward one another, the guide rail is configured to support the guide rail in multiple angular orientations about a central axis of a running rail of the guide rail. The guide rail includes a base portion and a first running rail. The first running rail defines a running axis. The running rail includes a plurality of angularly spaced facets that extend parallel to the running axis. The plurality of facets are arranged to define a convex portion of an outer periphery of the running rail. The plurality of facets includes at least a first facet, a second facet, a third facet and a fourth facet. The second facet is angularly positioned between the first and third bearing facets. The third facet is angularly positioned between the second and fourth facets. The fourth facet is angularly positioned between the third facet and the first facet. The first running rail is joined to the base portion with the facets being exposed and arranged such that in a first position, the guide wheel can ride with the first guide surface bearing on the first facet and the second guide surface bearing on the third facet and a second position angularly offset from the first position about the first running rail wherein the first guide surface can ride bearing on the second facet and the second guide surface can ride bearing on the fourth facet.

In yet another aspect, the invention provides a method of forming a plurality of linear guide assemblies, such that a plurality of different carriage arrangements can be formed that can be used with a common guide rail. One method includes the steps of forming a pair of first and second guide rails, with the guide rails being substantially identical and the steps of providing first and second carriages having differing characteristics.

Each guide rail includes first and second running rails. Each running rail including at least four facets including first, second, third and fourth facets extending around a central axis of the first guide rail. The second facet is positioned between the first and third facets. The third facet is positioned between the second and fourth facets. The fourth facet is positioned between the first and the third facets.

The first carriage includes a first guide wheel and a second guide wheel. The first guide wheel includes converging first and second guide surfaces forming a concave profile. The first guide wheel is oriented relative to the second guide wheel such that the first guide wheel rides on the first running rail with the first and second guide surfaces riding on a first pair of the first, second, third and fourth facets and the second guide wheel rides on the second running rail.

The second carriage includes a third guide wheel and a fourth guide wheel. The third guide wheel includes converging third and fourth guide surfaces forming a concave profile. The third guide wheel is oriented relative to the fourth guide wheel such that the third guide wheel rides on the first running rail of the second guide rail with the third and fourth guide surfaces riding on a different pair of the first, second, third and fourth facets than the pair of facets that the first guide wheel rides on and the fourth guide wheel rides on the second running rail of the second guide rail.

In a preferred method according to this aspect, the pairs of facets upon which the first and third guide wheels ride are separated by at least one intermediate facet.

In yet a further aspect, the invention provides a guide assembly including a guide carriage and a guide rail wherein the guide carriage includes at least one guide roller that includes a gap between the guide roller and the guide rail. Accordingly, a linear guide assembly comprising a guide rail and a carriage is provided. The guide rail includes spaced apart first and second running rails defining a longitudinal running axis. Each running rail includes a plurality of facets extending parallel to the longitudinal running axis and includes at least four facets. The carriage is carried by the running rails. The carriage includes a body supporting first and second guide wheels having first and second axes of rotation, respectively. Each guide wheel includes first and second lateral surfaces converging towards one another. The first guide wheel further includes a first flat surface interposed between the corresponding first and second lateral surfaces. The lateral surfaces of the first guide wheel converge toward the first flat surface. The first guide wheel rides on the first running rail with the first flat riding on and substantially parallel to one of the facets of the first running rail. The width of the first flat is greater than a width of the facet such that the first and second converging surfaces of the first guide wheel do not contact the first running rail simultaneously. The second guide wheel rides on the second running rail with only the first and second lateral surfaces contacting the second running rail.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
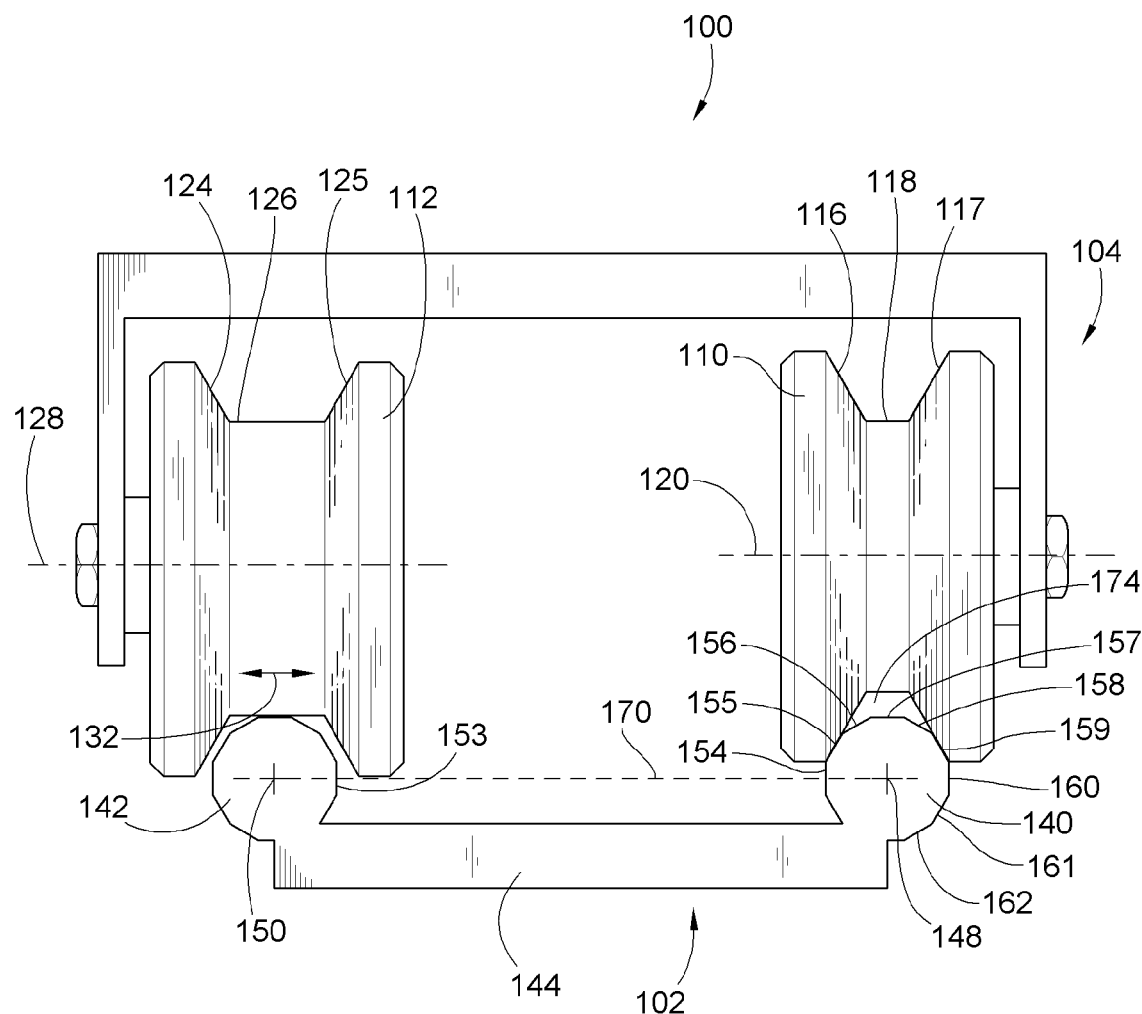
FIG. 1 is a front profile illustration of a guide assembly according to a first embodiment of the present invention.

FIG. 1 illustrates a front view of a first embodiment of a guide assembly 100 according to the teachings of the present invention. The guide assembly 100 includes a guide rail 102 and a carriage 104 that moves along, is supported by and is guided by guide rail 102. The guide assembly 100 has an auto-aligning feature that permits compensation in the movement of the carriage 104 to prevent binding of the carriage 104 on the guide rail 102 due to variations in the guide rail 102.

The carriage 104 includes a plurality of guide wheels including alignment wheels 110 and floating wheels 112. The alignment wheels 110 and floating wheels 112 provide a generally concave profile that are similar but differ in the widths of the concave profile of the wheels 110, 112.

Figure 4:
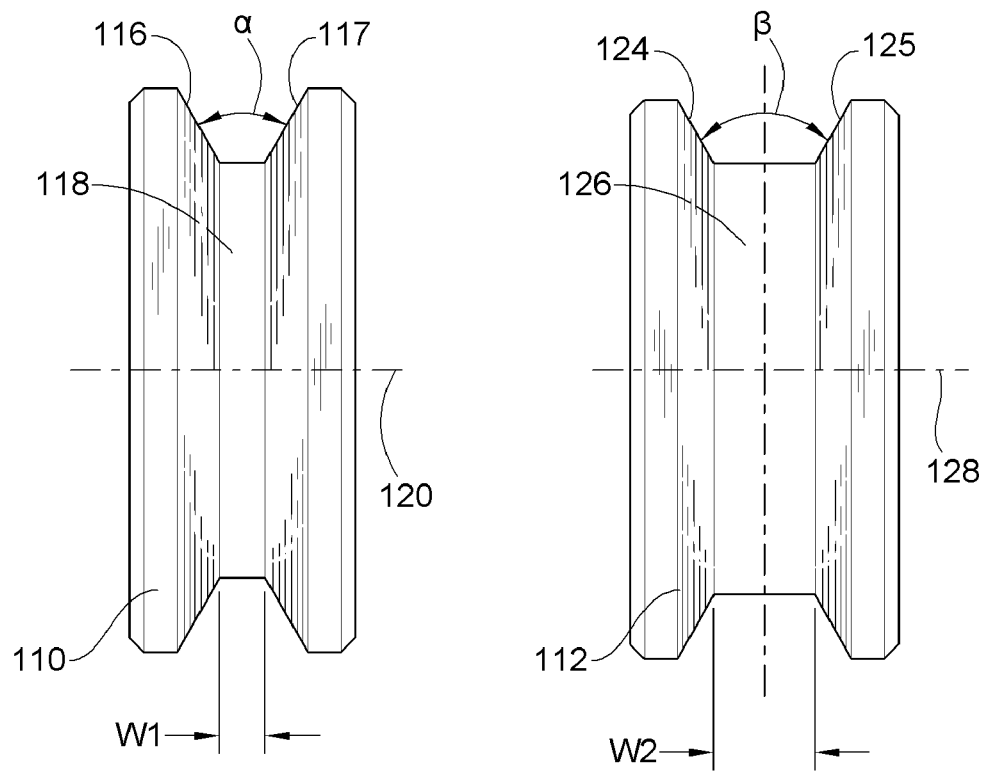
FIG. 4 is a profile illustration of the guide wheels of the carriage of FIG. 3.

With further reference to FIG. 4, each alignment wheel 110 includes guide surfaces 116, 117 that converge toward one another when viewed in a direction extending radially inward and connect to a flat surface 118 extending parallel to an axis of rotation 120 of the alignment wheel 110. The flat surface 118 has a width W1 extending between the two guide surfaces 116, 117. The two guide surfaces 116, 117 form an angle $\alpha$ therebetween. Angle $\alpha$ is preferably between about 45 degrees and 145 degrees and more preferably either about 60 degrees or about 120 degrees, as will be more fully explained below.

Similarly, each floating wheel 112 includes guide surfaces 124, 125 that, in the illustrated embodiment, converge toward one another when viewed in a direction extending radially inward and connect to a flat surface 126 extending parallel to an axis of rotation 128 of the floating wheel 112. The flat surface 126 has a width W2 extending between the two guide surfaces 124, 125. The two guide surfaces 124, 125 form an angle $\beta$ therebetween. Angle $\beta$ is preferably between about 45 degrees and 145 degrees and more preferably either about 60 degrees or about 120 degrees.

The primary difference between the alignment wheel 110 and the floating wheel 112 is that the width W1 of the flat surface 118 of the alignment wheel is less than the width W2 of the flat surface 126. As such, the guide wheels are configured with differing widths of the concave profile such that the alignment wheels 110 ride with both guide surfaces 116, 117 contacting the guide rail 102 while the floating wheels 112 ride with the flat surfaces 126 contacting the guide rail 102. This configuration permits the alignment wheels 110 to control the lateral movement perpendicular to the direction of travel of the carriage 104 without substantial lateral influence by the floating wheels 112. Because the floating wheels 112 ride on the flat surfaces 126, the floating wheels 126 are permitted to move laterally relative to the guide rail 102, such as illustrated by arrow 132. As such, the floating wheels 112 could be merely cylindrical wheels without any concave profile. The alignment wheels 110 closely track running rail 140 while the floating wheels 112 are permitted to "float" laterally relative to running rail 142. By being able to float laterally, the floating wheels 112 do not bind or interfere with the guidance along the guide rail 102 provided by the alignment wheels 110. In this configuration, the alignment wheels 110 both laterally aligns as well as supports the load of carriage 104, while the floating wheels 112 preferably only supports the load of carriage 104.

The illustrated guide rail 102 includes two running rails 140, 142 that are laterally spaced apart from one another and extend generally parallel to one another. The guide rail 102 defines a running axis along which the carriage 104 travels. The running rails 140, 142 illustrated are identical. The term "identical" is to take into consideration that the running rails 140, 142 can have minor variations and differences due to manufacturing tolerances and imperfections in the materials. Further, the running rails 140, 142 could be differently oriented but still be "identical." The running rails 140, 142 are mounted to a base portion 144 that connects the two running rails 140, 142. The base portion 144 can be used to mount the guide rail to a support structure. The guide rail 102 is preferably formed of a unitary piece such that the running rails 140, 142 and base portion 144 are simultaneously formed. More preferably, the guide rail 102 is formed from a metal material such as aluminum or steel.

The running rails 140, 142 may be initially extruded. However, the guide rail 102, and particularly running rails 140, 142 are preferably subsequently machined after being extruded to tighten the tolerance of the running rails 140, 142. Even more preferably, the subsequent machining process is a skiving process. However, the machining process could merely be standard grinding or milling. Alternatively, the guide rail 102 could be entirely machined or merely extruded without any subsequent machining, depending on the required tolerances.

The running rails 140, 142 each include a plurality of facets 153 that provide bearing surfaces upon which the guide wheels 110, 112 ride. The facets 153 may also be referred to as bearing facets. Herein, the facets 153 are generically identified by reference numeral 153 and more particularly by specific reference numerals where necessary. The facets 153 form at least a portion, if not the entire outer peripheries of the running rails 140, 142 that surround and define central axis 148, 150, respectively. Further, the facets 153, form a convex portion of the outer peripheries of the running rails 140, 142. Each facet 153, is preferably equally spaced a radial distance RI from central axes 148, 150 and preferably has a width W3, with all facets 153 having equal widths.

The illustrated running rails 140, 142 include nine (9) facets 153. Pairs of adjacent facets 153, such as facets 155, 156 extend relative to one another at an angle θ of approximately 150 degrees. However, other angular orientations are contemplated such that adjacent pairs of facets extend relative to each other at an angle θ that is greater than 90 degrees but less than 180 degrees.

Figure 2:
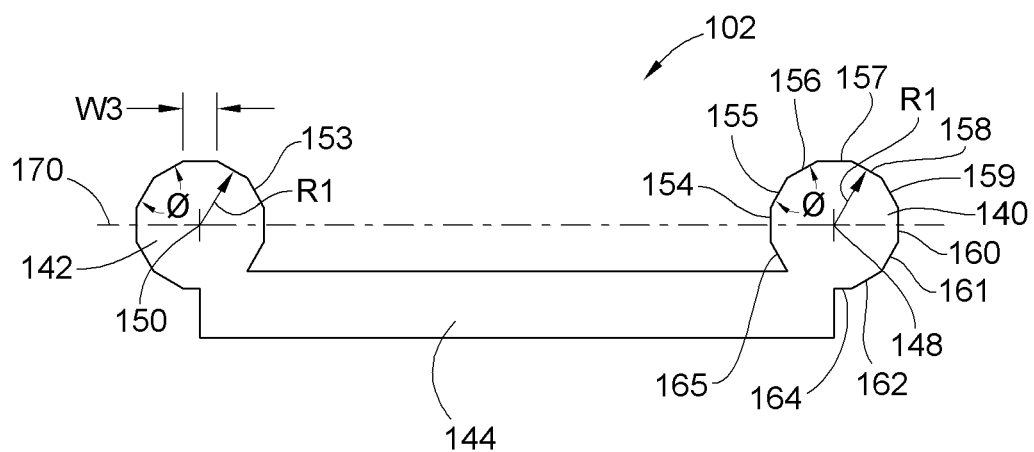
FIG. 2 is a profile illustration of the guide rail of the guide assembly of FIG. 1.

The facets 154 preferably combine to angularly surround the central axes 148, 150 by at least about 180 degrees and more preferably by at least 250 degrees. For example and with reference to running rail 140 of FIG. 2, facets 154-159 surround central axis 140 by 180 degrees and facets 154-162 surround central axis 148 by 270 degrees.

Figure 8:
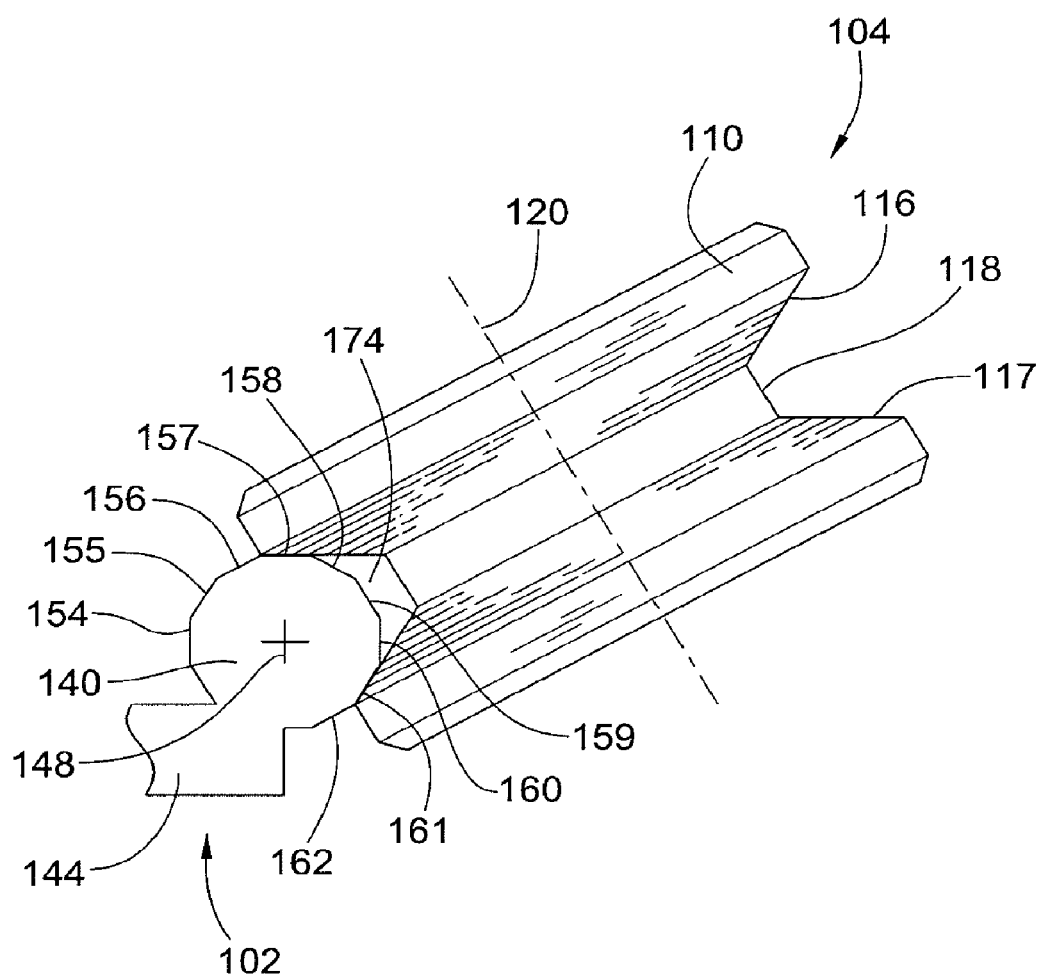
FIG. 8 is a front profile illustration of a guide wheel in an alternative position riding on different facets of the guide rail of FIG. 1.

By having numerous facets 153 angularly spaced around the central axes 148, 150, the guide rail 120 provides facets 153 that are exposed to provide support for guide wheels in numerous orientations (see for example FIGS. 1 and 8). For example, in a first angular orientation, an alignment wheel 110 could be oriented relative to running rail 140 such that guide surface 116 rides on facet 154, while guide surface 117 rides on facet 158. In a second angular orientation, an alignment wheel 110 could be oriented such that guide surface 116 rides on facet 158, while guide surface 117 rides on facet 162. Similarly, the alignment wheel 110 could be positioned at numerous angular positions between positions one and two. For instance, in a third angular orientation, as illustrated in FIG. 1, alignment wheel 110 could be oriented relative to running rail 140 such that guide surface 116 rides on facet 155, while guide surface 117 rides on facet 159. In a fourth orientation (FIG. 8), alignment wheel 110 can be oriented such that guide surface 116 rides on facet 157, while guide surface 117 on facet 161.

Because adjacent facets 153 of the illustrated embodiment extend relative to one another at approximately 150 degrees, the guide surfaces 116, 117 of the alignment wheels 110 preferably extend relative to one another at increments of the complimentary angle 30 degrees. In FIG. 1, the guide surfaces 116, 117 extend at angle α of approximately 60 degrees such that the guide surfaces 116, 117 can ride on facet 155 and facet 159, while bypassing contact with the three intermediate facets 156-158.

The base portion 144 of guide rail 102 extends laterally between the central axes 148, 150 and is offset from a plane 170 that includes the two central axes 148, 150. As such, the running rails 140, 142 are offset in two directions from base portion 144. In FIG. 4, the base portion 144 is entirely laterally offset from plane 170. This offset orientation permits increased exposure to various facets 153. The running rails 140, 142 include offset surfaces 164, 165 that transition between the facets 153 and the base portion 144.

Further permitting varying guide wheel arrangements is the various directions in which the running rails 140, 142 have facets 153 facing and exposed for engagement by guide wheels. For example, each running rail 140, 142 includes a plurality of facets that face laterally toward the other running rail 142, 140, respectively (see for example facets 154-156 of running rail 140). Each running rail 140, 142 also includes facets that face laterally away from the other running rail 142, 140, respectively (see for example facets 158-163 of running rail 140). The running rails 140, 142 also include facets 153 that are positioned entirely above and below plane 170. For example, running rail 140 includes facets 161, 162 that are below plane 170 and facets 155-159 that are above plane 170.

The guide assembly 100 of FIG. 1 is configured such that a gap 174 is formed between flat surface 118 and the running rail 140 upon which it rides. In this preferred configuration, the alignment wheel 110 only contacts the running rail 140 on two facets, namely facets 155, 159, with guide surfaces 116, 117, respectively. This allows for easier and less and tolerancing of the alignment wheel 110 because the flat surface 118 need not be tolerated because they do not interact with the running rail 140. As such, only two surfaces, guide surfaces 116, 117, interact with the running rail 140 rather than three surfaces, the guide surfaces 116, 117 and flat surface 118, such that only two surfaces of the alignment wheel need to be tolerated to ride on the running rail 140.

Figure 6:
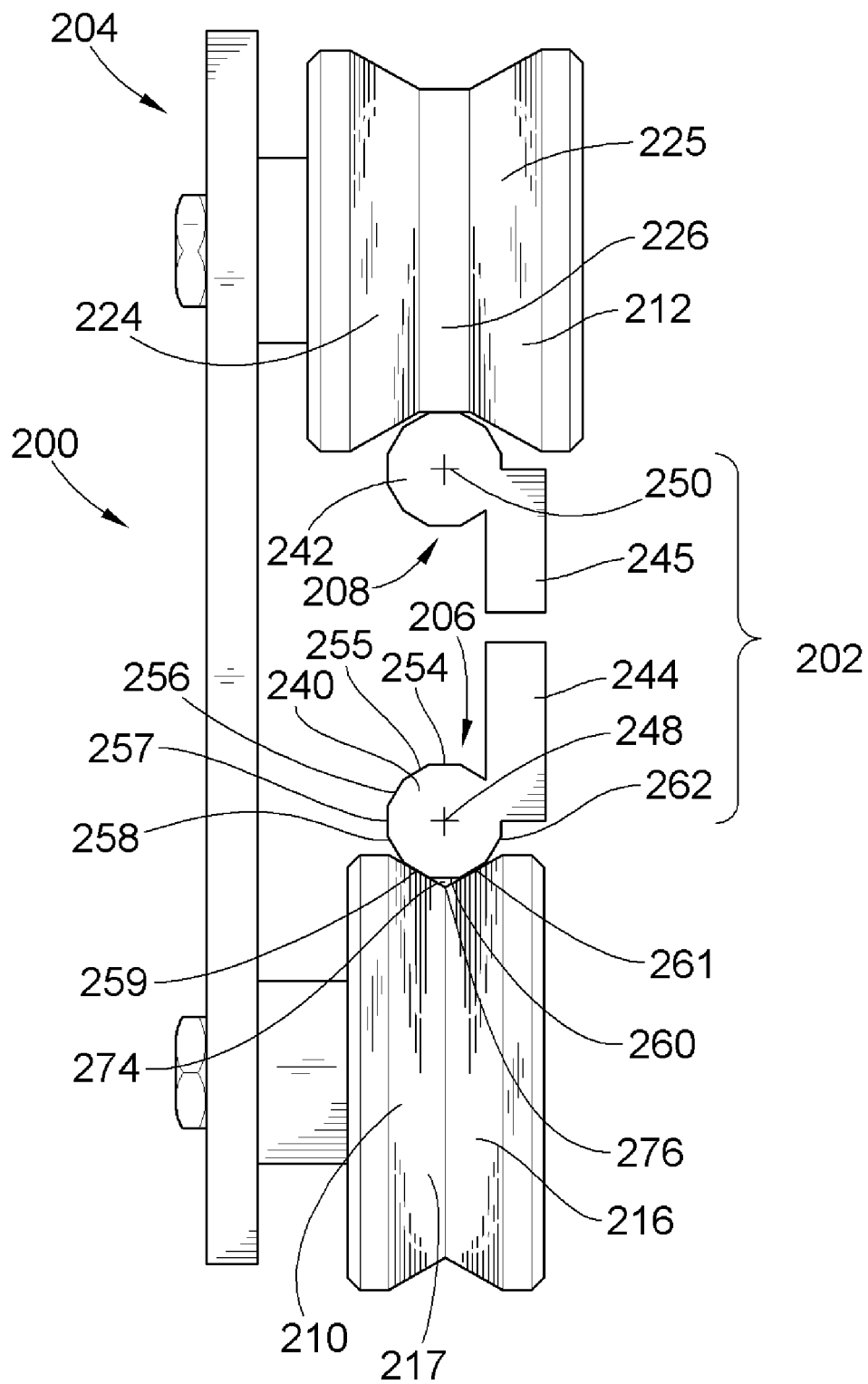
FIG. 6 is a front profile illustration of an alternative embodiment of a guide assembly according to the teachings of the present invention.

An alternative embodiment of a guide assembly 200 is illustrated in FIG. 6. This embodiment is similar to embodiment 100, and only those features that are different than those features of assembly 100 will be described.

In the illustrated embodiment, the guide rail 202 is formed of two separate guide rail portions 206, 208. The two guide rail portions 206, 208 substantially identical to one another. Each guide rail portion 206, 208 includes a running rail 240, 242, and a base portion 244, 245, respectively. The running rails 240, 242 are substantially identical to the running rails 140, 142 described previously. As illustrated, the bases 244, 245 are aligned generally planar, however, by using two separate guide rail portions 206, 208, the rail portions 206, 208 can be mounted to an external structure in varying angular orientations relative to one another as long as the central axis 248, 250 are properly aligned, such as being generally parallel to one another.

With reference to FIGS. 1 and 6, the running rails 140, 142 or 240, 242 provide a plurality of various bearing surfaces, i.e. each of the facets of the respective running rails. By having numerous bearing surfaces, numerous guide wheel configurations can be used with the guide rails. Also, numerous guide wheel orientations can be used with the guide rails. The variability in the system allows variation to configure the guide assembly according to loading and travel characteristics of the guide assembly.

The guide assembly 200 of this embodiment relative to the previous embodiment illustrates the benefits of the guide rails of the present invention. Namely, the fact that the guide wheels can be alternatively oriented relative to the guide rail 202. The alignment wheel 210 and floating wheel 212 are angularly oriented about running rails 240, 242, respectively, such that the guide wheels 210, 212 ride entirely on facets 253 that face laterally away from the other running rail.

Figure 7:
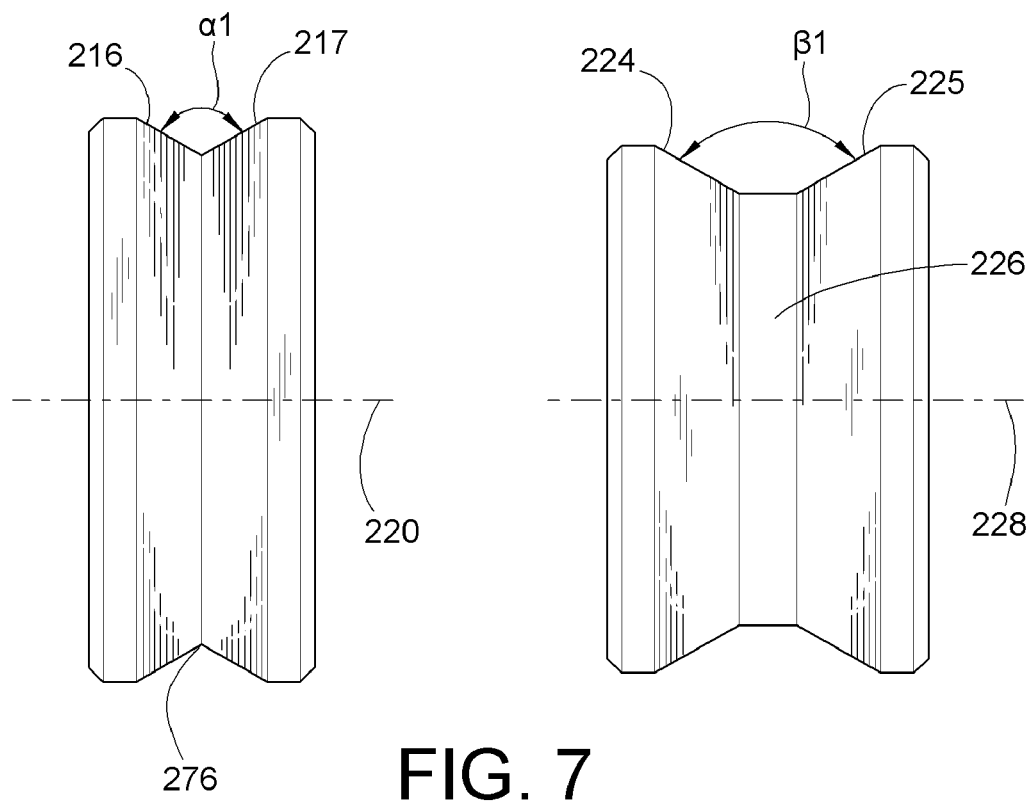
FIG. 7 is a profile illustration of the guide wheels of the carriage of the guide assembly of FIG. 6.

With further reference to FIG. 7, in this embodiment the angle between the guide surfaces 216, 218 of the alignment wheel 210 extend relative to one another at an angle α1 that is approximately 120 degrees, rather than the 60 degree orientation of alignment wheel 110. Similarly, guide surfaces 224, 225 extend relative to one another at an angle β1 that is approximately 120 degrees.

Beyond the different angle between the two guide surfaces 216, 217 than the angle between the guide surfaces 116, 117 of the previous embodiment, the alignment wheel 210 of this embodiment has a different concave profile than alignment wheel 110. Alignment wheel 210 does not include a flat surface interposed between the two guide surfaces 216, 217. The guide surfaces 216, 217 converge toward one another when moving radially inward and intersect at a vertex 276. As such, in this embodiment, a gap 274 is formed between the alignment wheel 210 and the running rail 140.

Figure 5:
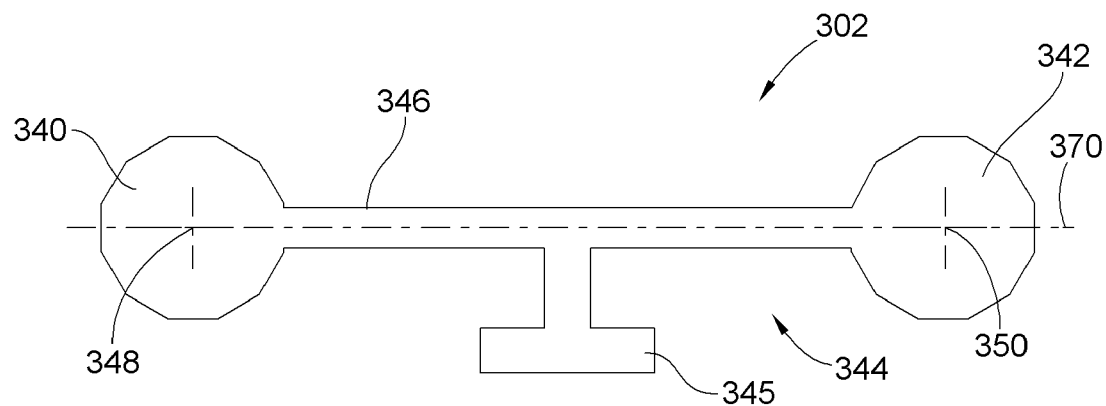
FIG. 5 is an alternative embodiment of a guide rail according to the teachings of the present invention.
Figure 3:
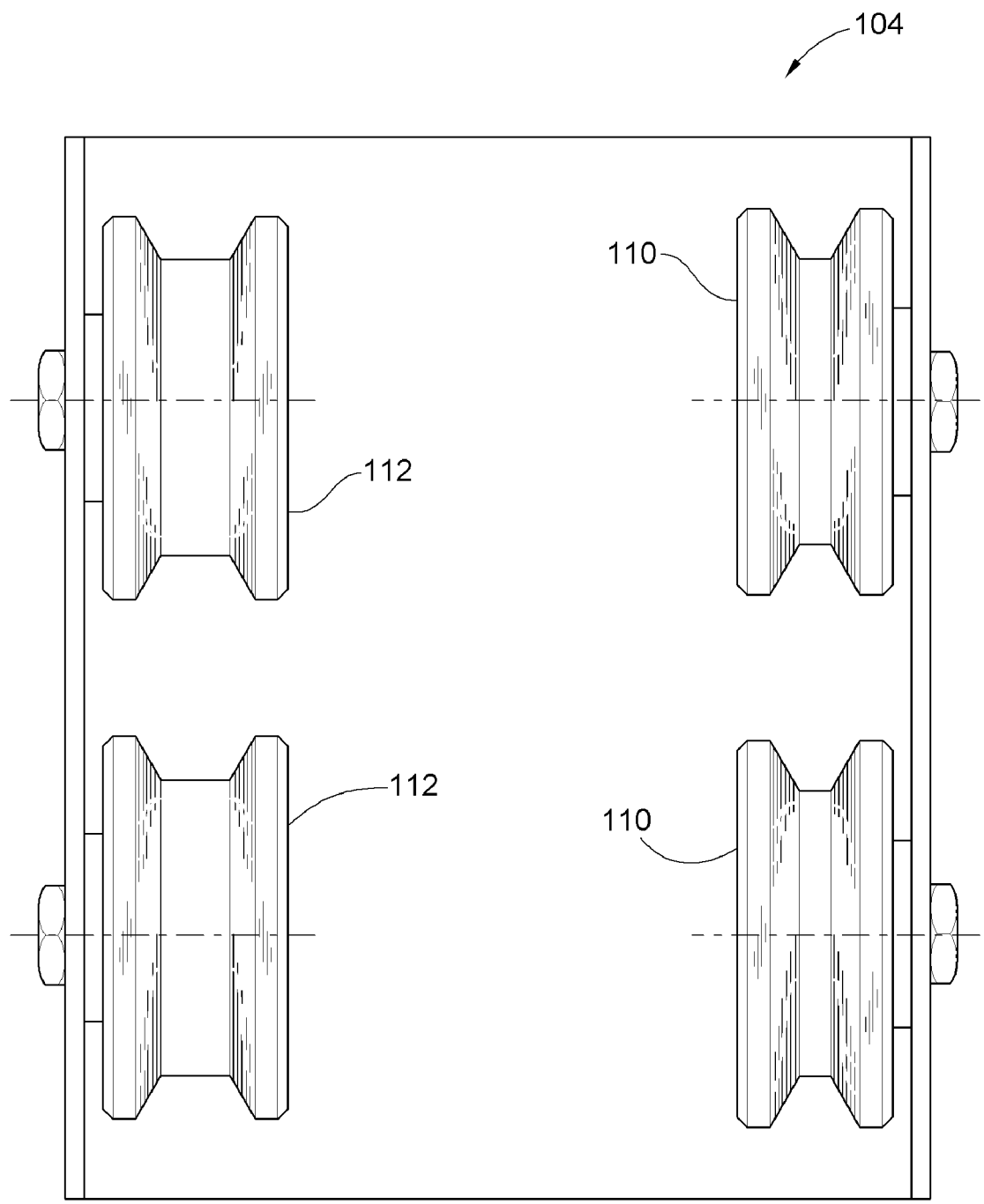
FIG. 3 is a bottom illustration of carriage of the guide assembly of FIG. 1.

Alternative embodiments of the guide rail are contemplated. For example, in FIG. 5, for example, the guide rail 302 has a base 344 that includes a laterally extending member 346 that is directly positioned between the central axes 348, 350 of the running rails 340, 342, respectively. The base 344 includes a mounting portion 345 that is offset from the plane 370 that includes the central axes 348, 350 for mounting the guide rail 302.

The present invention also provides a method of forming a plurality of guide assemblies. The method generally relates to providing a single type of guide rail while providing a plurality of different types of carriages having differing characteristics that can ride on that single type of guide rail. The differing characteristic primarily relates to the orientation and arrangement of the guide wheels. In one method, the method of forming the guide assemblies includes providing first and second guide rails that are substantially identical. For example, the provided guide rails could be in the form of guide rails 102, 202, and 302 described above. Preferably, the guide rails include a plurality of facets, more preferably at least four facets. As such, the guide rails preferably include at least first, second, third, and fourth facets, with the second facet interposed between the first and third facet, the third facet interposed between the second and fourth facet and the fourth facet interposed between the first and third facet.

The method also includes providing first and second carriages for combining with individual ones of the guide rails so as to form guide assemblies. Each carriage includes an alignment wheel that includes converging guide surfaces upon which the alignment wheel contacts the guide rail and a floating wheel. The floating wheel preferably includes a flat surface. As such, the guide wheels 110, 112, 210, 212, discussed previously could suffice. At least one of the carriages has a characteristic that is different than another one of the carriages. For example, a first carriage may be configured such that the alignment wheel rides on the first and third facets of one of the running rails of its corresponding guide rail while a second carriage may be configured such that its alignment wheel rides on the second and fourth facets of one of the running rails of its corresponding guide rail.

The method could be performed, for example, by providing several guide rails like guide rail 102 described above and then also providing a first carriage configured like carriage 104 where both guide wheels of the carriage are positioned on the same side of the plane that passes through the central axes 148, 150 of the running rails 140, 142 of guide rail 102 while the second carriage could be configured similar to carriage 204 such that the two guide wheels 210, 212 are on opposite sides of the guide rail 102 such that the axes of rotation of the guide wheels 210, 212 extend perpendicularly to the plane 170 that is defined by the central axes 148, 150. Alternatively, the method could be practiced by providing two carriages that are similarly configured as carriage 102 such that both guide wheels are on the same side of the guide rail, but the two carriages could differ merely by having different types of guide wheels. One carriage could include guide wheels like guide wheels 110, 112 while the other carriage could include guide wheels like guide wheels 210, 212.

It will be noted in these previously discussed examples, the alignment wheels of the two differing carriage configurations would have the respective guide surfaces riding on different parings of facets of the guide rails. As such, the method provides the benefit of being able to manufacture a single guide rail type but provide varying carriage configurations.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed as to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A linear guide rail comprising:
 a first base portion; and
 a first running rail portion joined to the base portion defining longitudinal running axis and including a plurality of bearing facets forming a generally convex outer periphery about a first central axis of the first running rail portion, the central axis being parallel to the running axis, the plurality of bearing facets including at least four bearing facets extending parallel to the first central axis, each of the bearing facets having a width extending perpendicular to the first central axis;

wherein the widths of the at least four bearing facets are equal; and wherein the running rail portion includes nine bearing facets, wherein each pair of adjacent bearing facets forms an angle therebetween being approximately 150 degrees.

2. The linear guide rail of claim 1, further comprising a second running rail portion identical to the first running rail portion, the second running rail portion, extending parallel to the running axis and being spaced apart from the first running rail portion and defining a second central axis.

3. The linear guide rail of claim 2, further comprising a second base portion, the second running rail portion joined to the second portion, the first and second portions being separate from and independent of one another.

4. A linear guide rail comprising:

a first base portion; and a first running rail portion joined to the base portion defining a longitudinal running axis and including a plurality of bearing facets forming a generally convex outer periphery about a first central axis of the first running rail portion, the central axis being parallel to the running axis, the plurality of bearing facets including at least four bearing facets extending parallel to the first central axis, each of the bearing facets having a width extending perpendicular to the first central axis, wherein the widths of the at least four bearing facets are equal; and further comprising a second running rail portion identical to the first running rail portion and being laterally spaced from the first running rail and defining a second central axis, wherein at least one bearing facet of each running rail portion laterally faces the other running rail portion and at least another bearing facet of each running rail portion faces away from the other running rail portion.

5. The linear guide rail of claim 1, further comprising a second running rail portion identical to the first running rail portion and being laterally spaced from the first running rail and defining a second central axis, wherein at least four bearing facets of each running rail portion do not laterally face toward the other running rail portion or the first base portion.

6. A liner guide rail comprising:

a first base portion; and a first running rail portion joined to the base portion defining a longitudinal running axes and including a plurality of bearing facets forming a generally convex outer periphery about a first central axis of the first running rail portion, the central axis being parallel to the running axis, the plurality of bearing facets including at least four bearing facets extending parallel to the first central axis, each of the bearing facets having a width extending perpendicular to the first central axis: wherein the widths of the at least four bearing facets are equal;

further comprising a second running rail portion identical to the first running rail portion and being laterally spaced from the first running rail and defining a second central axis, wherein at least four bearing facets of each running rail portion do not laterally face toward the other running rail portion or the first base portion; and wherein the base portion extends laterally from about the first central axis to about the second central axis, and wherein the base portion is entirely offset from a plane passing through the first and second central axes, and the first and second running rail portions each include at least two facets positioned entirely on the base portion side of the plane and at least two facets positioned entirely on the opposite side of the plane as the base portion.

7. A linear guide rail for supporting at least one concave profile guide wheel having first and second guide surfaces converging toward one another, comprising a base portion; and a first running rail defining a running axis, the running rail including a plurality of angularly spaced facets extending parallel to the running axis, the plurality of facets arranged to define a convex portion of an outer periphery of the running rail, the plurality of facets including at least a first facet, a second facet, a third facet and a fourth facet, with the second facet being angularly positioned between the first and third bearing facets, the third facet being angularly positioned between the second and fourth facets and the fourth facet angularly positioned between the third facet and the first facet, the first running rail being joined to the base portion with the facets being exposed and arranged such that in a first position, the guide wheel can ride with the first guide surface bearing on the first facet and the second guide surface bearing on the third facet and a second position angularly offset from the first position about the first running rail wherein the first guide surface can ride bearing on the second facet and the second guide surface can ride bearing on the fourth facet.

8. The linear guide rail of claim 7, further comprising fifth, sixth and seventh facets, the fifth facet angularly interposed between the first and second facets, the sixth facet angularly interposed between the second and third facets and the seventh facet angularly interposed between the third and the fourth facet.

9. A linear guide rail for supporting at least one concave profile guide wheel having first and second guide surfaces converging toward one another, comprising a base portion;

a first running rail defining a running axis, the running rail including a plurality of angularly spaced facets extending parallel to the running axes, the plurality of facets arranged to define a convex portion of an outer periphery of the running rail, the plurality of facets including at least a first facet, a second facet a third facet and a fourth facet, with the second facet being angularly positioned between the first and third bearing facets, the third facet being angularly positioned between the first a second and fourth facets and the fourth facet angularly positioned between the third facet and the first facet, the first running rail being joined to the base portion with the facets being exposed and arranged such that in the first position, the guide wheel can ride with the first guide surface bearing on the first facet and the second guide surface bearing on the third facet and a second position angularly offset from the first position about the first running rail wherein the first guide surface can ride bearing on the second facet and the second guide surface can ride bearing on the fourth facet;

further comprising fifth, sixth and seventh facets, the fifth facet angularly interposed between the first and second facets, the sixth facet angularly interposed between the second and third facets and the seventh facet angularly interposed between the third and the fourth facet; and further comprising a second running rail joined to the base portion, the second running rail being spaced apart from the first running rail and being identical to the first running rail.

10. The linear guide rail of claim 9, further comprising a second running rail joined to the base portion, the second running rail being spaced apart from the first running rail and being identical to the first running rail, each running rail having a central axis from which each facet of the running rail is equally spaced and the outer periphery of each running rail formed by abutting adjacent facets extends about the central axis by more than 180 degrees.

11. The linear guide rail of claim 10, wherein the first and second running rails include at least nine facets, wherein adjacent ones of facets of an individual running rail extend at about 150 degrees relative to one another.

12. The linear guide rail of claim 11, wherein each facet defines a first width extending perpendicular to the running axis, wherein all first widths are equal, and wherein each of the first and second running rails includes an offset surface spacing the facets away from the base portion, the offset surfaces defining second widths extending perpendicular to the running axis, the second widths being different than the first widths.

13. The linear guide rail of claim 12, wherein the outer periphery of each running rail formed by the facets extends around the central axis of the running rail at least 265 degrees.

14. A method of forming a plurality of linear guide assemblies comprising the steps of:
  forming a first linear guide assembly including the steps of:
    providing a first guide rail including first and second running rails, each running rail including at least four facets including first, second, third and fourth facets extending around a central axis of the first guide rail with the second facet between the first and third facet, the third facet between the second and fourth facet, and the fourth facet between the first and the third facet and extending a length of the running rails parallel to a running axis of the first guide rail;
    providing a first carriage including a first guide wheel and a second guide wheel, the first guide wheel including converging first and second guide surfaces forming a concave profile, the first guide wheel oriented relative to the second guide wheel such that the first wide wheel rides on the first running rail with the first and second guide surfaces riding on a first pair of the first, second, third and fourth facets and the second guide wheel rides on the second running rail;
  forming a second linear guide assembly including the steps of;
    providing a second guide rail substantially identical to the first guide rail; and
    providing a second carriage including a third guide wheel and a fourth guide wheel, the third guide wheel including converging third and fourth guide surfaces forming a concave profile, the third guide wheel oriented relative to the fourth guide wheel such that the third guide wheel rides on the first running rail of the second guide rail with the third and fourth guide surfaces riding on a different pair of the first, second, third and fourth facets than the pair of facets that the first guide wheel rides on and the fourth guide wheel rides on the second running rail of the second guide rail; and
  wherein the facets that the first and second guide surfaces ride upon are separated by at least one intermediate facet, and wherein the facets that the third and fourth guide surfaces ride upon are separated by at least one intermediate facet.

15. A linear guide assembly comprising:
  a guide rail including spaced apart first and second running rails defining a longitudinal running axis, each running rail including a plurality of facets extending parallel to the longitudinal running axis including at least four facets,
  a carriage carried by the running rails, the carriage including a body supporting first and second guide wheels having first and second axes of rotation, respectively, each guide wheel including first and second lateral surfaces converging toward one another, the first guide wheel further including a first flat surface interposed between the lateral surfaces, the lateral surfaces of the first guide wheel converging toward the first flat surface;
  wherein the first guide wheel rides on the first running rail with the first flat riding on and substantially parallel to one of the facets of the first running rail, wherein the width of the first flat is greater than a width of the facet such that first and second converging surfaces of the first guide wheel do not contact the first running rail simultaneously;
  wherein the second guide wheel rides on the second running rail with only the first and second lateral surfaces contacting the second running rail;
  wherein the first lateral surface of the second guide wheel rides on a first one of the facets of the second running rail and the second lateral surface rides on a second one of the facets of the second running rail, wherein the first and second facets are separated by a third one of the plurality of facets of the second running rail, wherein the third one of the facets is substantially parallel to the second axis of rotation;
  wherein the first lateral surface of the second guide wheel rides on a first one of the facets of the second running rail and the second lateral surface rides on a second one of the facets of the second running rail, wherein the first and second facets are separated by a third one of the plurality of facets of the second running rail, wherein the third one of the facets is substantially parallel to the second axis of rotation; and
  wherein the first and second lateral surfaces of the second guide wheel converge to a point, wherein a gap is formed between the point and the facet interposed between the facets upon which the two lateral surfaces ride.

16. A linear guide assembly comprising:
  a guide rail including spaced apart first and second running rails defining a longitudinal running axis, each running rail including a plurality of facets extending parallel to the longitudinal running axis including at least four facets,
  a carriage carried by the running rails, the carriage including a body supporting first and second guide wheels having first and second axes of rotation, respectively, each guide wheel including first and second lateral surfaces converging towards one another, the first guide wheel further including a first flat surface interposed between the laterals surfaces, the laterals surfaces of the first guide wheel converging toward the first flat surface;
  wherein the first guide wheel rides on the first running rail with the first flat riding on and substantially parallel to one of the facets of the first running rail, wherein the width of the first flat is greater than a width of the facet such that the first and second converging surfaces of the first guide wheel do not contact the first running rail simultaneously;

wherein the second guide wheel rides on the second running rail with only the first and second lateral surfaces contacting the second running rail;

wherein the first lateral surface of the second guide wheel rides on a first one of the facets of the second running rail and the second lateral surface rides on a second one of the facets of the second running rail, wherein the first and second facets are separated by a third one of the plurality of facets of the second running rail, wherein the third one of the facets is substantially parallel to the second axis of rotation;

wherein the first lateral surface of the second guide wheel rides on a first one of the facets of the second running rail and the second lateral surface rides on a second one of the facets of the second running rail, wherein the first and second facets are separated by a third one of the plurality of facets of the second running rail, wherein the third one of the facets is substantially parallel to the second axis of rotation; and wherein all pairs of adjacent ones of the first, second and third facets of the first and second running rails, respectively, extend relative to one another at an angle of approximately 150 degrees.

17. The linear guide assembly of claim 16, wherein the second guide wheel further includes a second flat surface extending between the first and second lateral surfaces of the second guide wheel, wherein a gap is formed between the second flat and the third facet.

18. The linear guide assembly of claim 16, wherein the first running rail defines a first central axis extending parallel to the running axis and being equally spaced from each facet of the first running rail, and the second running rail defines a second central axis extending parallel to the running axis and being equally spaced from each facet of the second running rail, wherein the facets of the first running rail combine to surround the first central axis more than 180 degrees, wherein the facets of the second running rail combine to surround the second central axis more than 180 degrees.

* * * * *

UNITED STATES PATENT AND TRADEMARK OFFICE
CERTIFICATE OF CORRECTION

PATENT NO. : 7,752,978 B2
APPLICATION NO. : 11/943958
DATED : July 13, 2010
INVENTOR(S) : Jonathan R. Schroeder It is certified that error appears in the above-identified patent and that said Letters Patent is hereby corrected as shown below:

In column 10, line 41, "axes," should be changed to -- axis, --.

In column 10, line 44, a -- , -- should be inserted after -- a second facet, --.

In column 10, line 47, "first a" should be deleted.

In column 10, line 51, "the" should be -- a --.

Signed and Sealed this

Ninth Day of November, 2010

David J. Kappos
*Director of the United States Patent and Trademark Office*